United States Patent [19]
Vosper

[11] 4,383,544
[45] May 17, 1983

[54] BOILER LOW WATER LEVEL SENSING DEVICE

[76] Inventor: George W. Vosper, 149 Earl St., Kingston, Ontario, Canada, K7L 2H3

[21] Appl. No.: 234,636

[22] Filed: Feb. 17, 1981

Related U.S. Application Data

[63] Continuation-in-part of Ser. No. 183,749, Sep. 3, 1980, which is a continuation-in-part of Ser. No. 60,488, Jul. 25, 1979, abandoned.

[51] Int. Cl.³ .............................................. F22B 37/46
[52] U.S. Cl. ....................................... 137/94; 73/1 H; 73/304 R; 122/504
[58] Field of Search ............................ 73/1 H, 304 R; 122/448 R, 504; 137/94, 392

[56] References Cited

U.S. PATENT DOCUMENTS

| | | | |
|---|---|---|---|
| 1,977,898 | 10/1934 | Seniff | 73/304 R |
| 2,065,634 | 12/1936 | Warrick | 122/504 |
| 2,274,939 | 3/1942 | Ray | 122/504 X |
| 2,446,778 | 8/1948 | Mesh | 122/504 |
| 2,573,035 | 10/1951 | Long | 137/94 |
| 3,014,205 | 12/1961 | Boehm | 340/515 |
| 3,673,850 | 7/1972 | Burrus | 73/1 H |
| 3,831,429 | 8/1974 | Kmiecik | 73/1 H |

FOREIGN PATENT DOCUMENTS

509784  9/1976  U.S.S.R. ................................ 73/1 H

Primary Examiner—Robert G. Nilson
Attorney, Agent, or Firm—Lowe, King, Price & Becker

[57] ABSTRACT

A low liquid level sensor in a hot water heating system permitting testing operability thereof in situ without draining down the system. The sensor is located in a cavity that has an opening in the bottom thereof in fluid communication with the liquid in the vessel during normal operation of the system. The end of the opening is at a lower elevation than the sensor and liquid from the vessel is in the cavity during normal operation of the system. When the liquid drops to a predetermined low level the sensor activates the safety cut-off. Valved passage means are provided exteriorly of the vessel so that a gas can be injected into the cavity to pressurize the same and drive the liquid in the cavity through the opening into the vessel simulating a low water level condition. At the simulated low water level condition operability of the sensor can be determined. Means are provided to release the gas from the cavity. The sensor is mounted by an insulator that projects into the cavity and the gas release means is spaced from the end of the cavity so that an air pocket is maintained reducing the tendency of conductive deposits to build up on the insulator. A fail safe circuit is provided avoiding malfunctioning of the cut-off safety control should there be a large build up of conductive deposits on the insulator.

14 Claims, 8 Drawing Figures

BOILER LOW WATER LEVEL SENSING DEVICE

This is a continuation-in-part of applicant's pending continuation-in-part application Ser. No. 183,749 filed Sept. 3, 1980 as a continuation-in-part of applicant's application Ser. No. 060,488 filed July 25, 1979, now abandoned.

This invention relates to an improved low liquid level sensing device in a hot water heating system that permits testing operability of the low water safety control without any major disruption in the operation of the system. Testing for operability is effected by simulating a low water condition. The invention is also directed to a sensing device so constructed as to minimize malfunctioning that often results from a build up of conductive deposits.

Codes require hot water boiler heating systems to have a low water safety cut-off device permanently installed in the system and which cannot be isolated therefrom. During normal operation of a system the cut-off devices are seldom activated and it is necessary from time to time to test their operability. Previously this was done by partially draining down the system so that the water in the boiler actually reaches the predetermined water level at which cut-off would occur. Draining down a system, however, is time consuming and particularly in high-rise buildings where the room heating radiators are at a much higher elevation than the boiler.

In existing systems a sensing probe projects into the water in the boiler and acts as a switch to energize a relay that closes contacts in the safety circuit permitting the burner to operate. If the water level drops below the lower end of the probe the relay is de-energized and the contacts open interrupting the safety circuit. Frequently, however, the devices will not perform their intended function because of conductive deposits that build up on the insulator mounting the probe in the boiler. The build-up of conductive deposits can be such that sufficient current will flow for the relay to remain energized even when the liquid drops below the probe.

A principal object of the present invention is to provide a low water sensing device which allows testing thereof by simulating a low water condition.

A further object of the present invention is to provide a low water sensing device that fails safe in the event of a build-up of conductive deposits. The fail safe circuit shuts off boiler when there is a build-up of conductive deposits on the sensor mounting which deposits would otherwise render the safety cut-off circuit inoperative.

To implement the foregoing object there is provided in accordance with the present invention a hot water heating system having water in a boiler and a low water level sensor and safety cut-off device associated with the boiler and operable to shut off the system when the water in the boiler drops below a predetermined level, said low water sensor device comprising:

(a) a housing having a cavity;
(b) means mounting said housing on an upper wall of the vessel;
(c) a sensor in said cavity responsive to the liquid level therein and operably associated with the burner of the system to shut off the same when the liquid level in the boiler drops below a predetermined level;
(d) a passageway extending downwardly from said sensor into the interior of the vessel and having an open inlet end immersed in the water during normal operation of the boiler;
(e) valved passage means in said housing disposed exteriorly of the vessel for injecting a gas into said cavity to pressurize the cavity above the normal pressure therein; and
(f) means, located exteriorly of the vessel, for releasing the gas from said cavity. In the preferred form of the invention the gas release means is spaced downwardly from the upper end of the cavity so as to maintain an air bubble of selected size at all times in the upper part of the cavity. This air bubble permits the use of a fail-safe circuit provided in accordance with another aspect of the present invention.

The invention is illustrated by way of example with reference to the accompanying drawings wherein.

Figure 1:
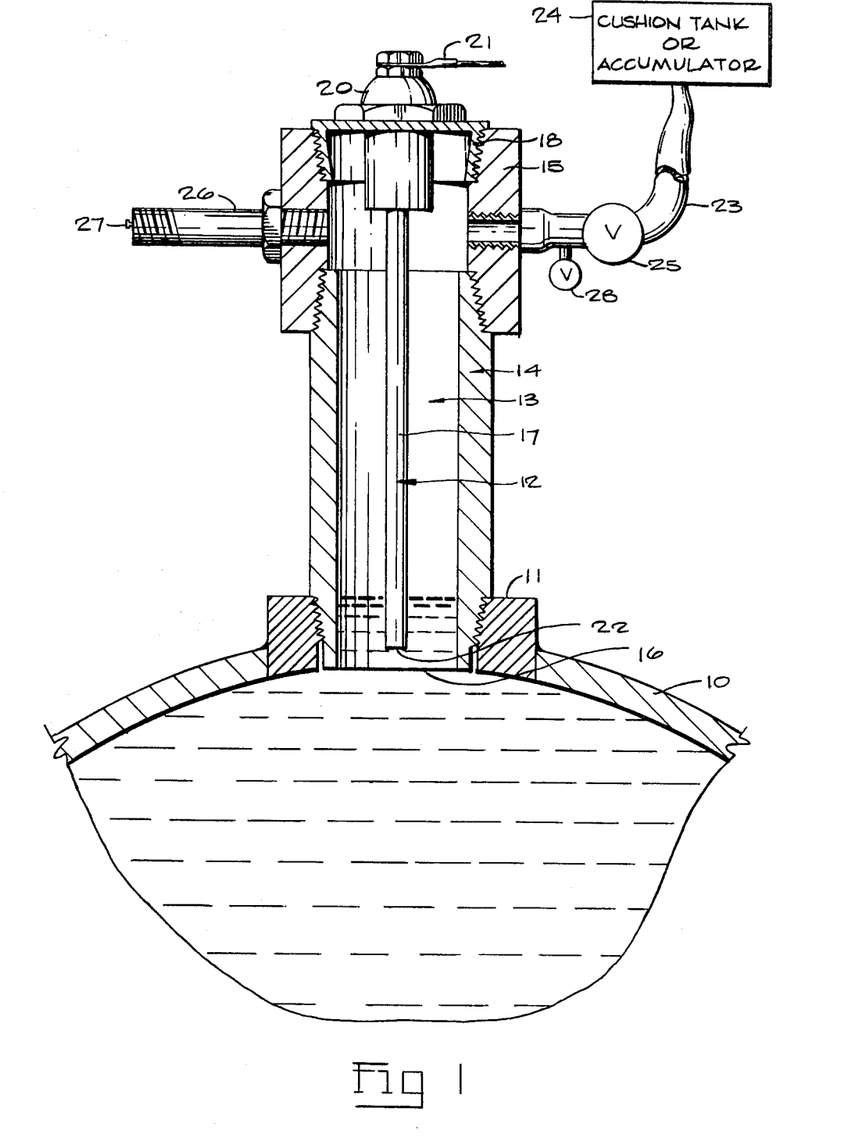
FIG. 1 is an elevational, partial sectional view illustrating one form of device constructed in accordance with the present invention installed in a boiler of a hot water heating system and wherein the level of water is dropping.
Figure 2:
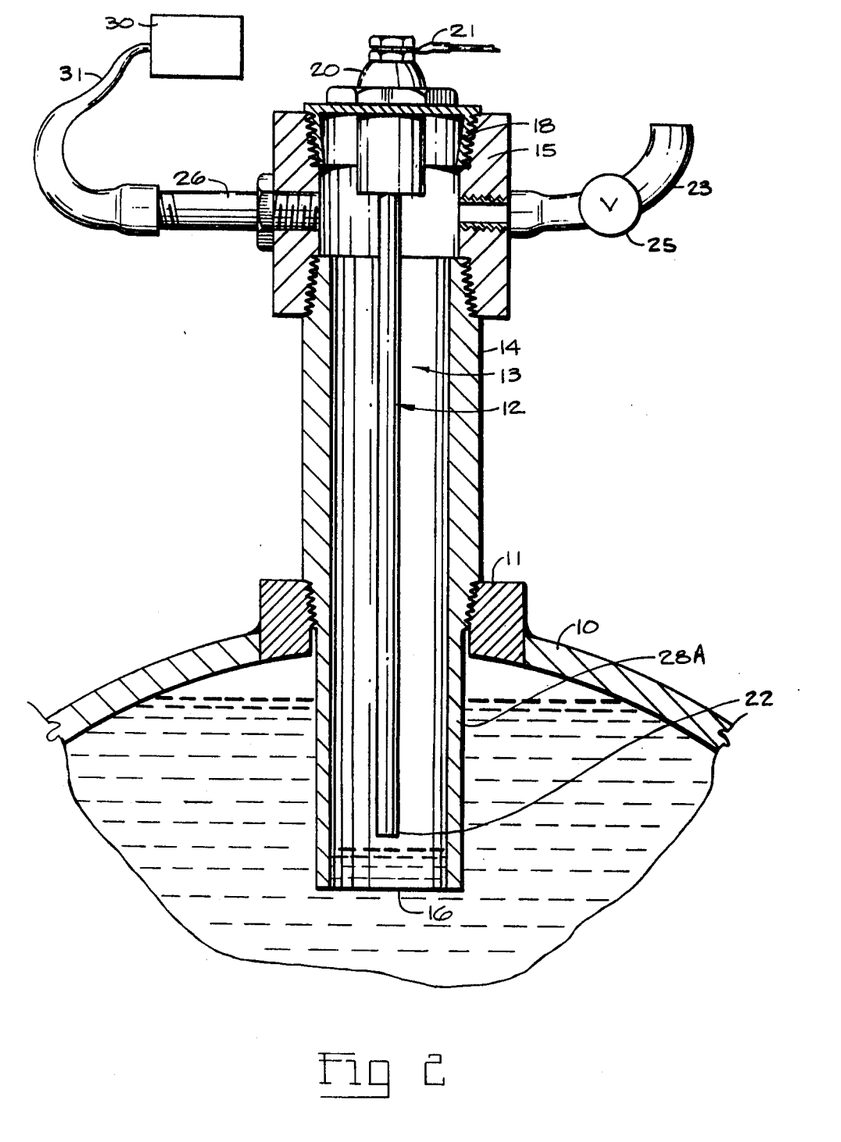
FIG. 2 is similar to FIG. 1 illustrating minor modifications to the device and wherein operability of the sensor is being testing by pressurizing the cavity containing the sensor probe.

Referring to the drawings, there is illustrated in FIGS. 1 and 2 the upper portion of a boiler or vessel 10 of a hot water heating system and which vessel or boiler has an internally threaded aperture or bushing 11 in the upper wall thereof. A liquid level sensor 12 is located in a cavity 13 of a housing 14 and which housing is mounted on the vessel so that the cavity is in fluid flow communication with the interior of the vessel.

During normal operation of the boiler, the cavity is partially filled with water contained in the boiler. When the level of water in the boiler drops below a predetermined level, the liquid level sensor deactivates the system in a conventional manner. In the embodiments illustrated, such predetermined low water level is in one instance, the position of the lower end of the pipe (FIG. 2), and in another instance the position of the free lower terminal end of the electrode sensor (FIG. 1).

In accordance with the present invention the sensor is arranged in a cavity of a housing so constructed that a low water condition can be simulated by pressurizing the cavity sufficiently to lower the water therein to such an extent that the low water cut-off circuit is activated by the sensor. A valved passageway to the cavity is provided through the housing portion disposed exteriorly of the vessel. Also, the valved passageway is spaced from the end of the cavity so that there is always, during operation, an air space thereby minimizing the build-up of conductive deposits on the insulator mounting the sensor in the housing. A fail-safe circuit is also provided and which will be described in detail hereinafter.

Referring to FIG. 1, the housing 14 comprises a pipe threaded at one end into the bushing 11 of the vessel and a coupling 15 threaded onto the other end. The lower end 16 of the pipe is open providing an inlet to the cavity 13. The sensor 12 consists of an electrode suspended from a plug 18 threaded into the upper end of the coupling 15. The electrode is electrically isolated from the plug 18 by an insulator 20 and the electrode is suitably connected in a conventional manner to the control circuitry of the system by an electrode lead 21. The electrode has a lower terminal end 22 at a higher elevation that the open end 16 of the pipe and such lower terminal end 22 is positioned at the predetermined low water level cut-off point.

The upper end of cavity 13 is in fluid flow communication with some higher point in the system by piping or conduit means 23 or alternatively with a cushion tank or accumulator 24. There is a normally open valve 25 in line 23 that can be closed when one wants to pressurize cavity 13 for testing operability of the electrode sensor. The passageway through the housing, connected to line 23, is spaced from the upper end of the cavity and which space remains filled with air during normal operation of the system. This reduces the tendency of conductive deposits to build up on the insulator 15 that can result in inoperability of the safety-cut-off.

Means are provided which permits injecting a gas under pressure into the cavity 13. Such means consist of a valve stem 26 threaded into the coupling 15 and in which stem there is a valve 27. The valve and valve stem may, for example, be the same as utilized on pneumatic tires for inflating the tire. To simulate a low water situation, valve 25 is first closed and then air, by way of a hand pump or air hose connected to a compressor, is injected into the cavity 13 through the valve 27. As the air pressure builds up in the cavity the column of water is driven down below the lower terminal end of the electrode. It might be pointed out here, introduction of air into the vessel is avoided by keeping the air pressure below that necessary to drive the entire column of water in the cavity through the open end 16 of the pipe. Interruption in operation of the system (or electrical test of the circuit) quickly indicates whether or not the low water cut-off device and/or sensor is operable. After such determination has been made, the air injected into the cavity is released restoring the system to normal operation. The injected air can be released through valve 27 or alternatively through a separate air bleed off valve 28 in line 23 or simply by opening valve 25. Valve 25 is normally open allowing free flow from the cavity through conduit 23 to some higher point in the system or the accumulator.

In the embodiment illustrated in FIG. 2 the pipe has an end portion 28A that projects into the boiler vessel. Line 23 is open to atmosphere and thus valve 25 is normally closed during operation of the system. The location of the lower open end 16 of the pipe determines the low water cut-off point as the water will not drain from the cavity until the water level in the vessel drops below the end of the pipe. The area in the vessel above the pipe open end 16 provides a space for air (should there be any) to accumulate. This prevents air from accumulating in the cavity 13 and causing a false activation of the cut-off. In FIG. 2 there is also shown an air pressurizing means 30 connected to the valve stem 26 by a hose 31. The cavity 13 has been pressurized driving the liquid level to a position below the lower end 22 of the electrode for testing purposes.

The low water safety cut-off sensor illustrated in FIGS. 1 and 2 is an electrode type. However, the present method is applicable to any type of sensor utilized in a low water safety or cut-off device and may be a float.

It will be obvious from the foregoing that one requisite of the present invention is that the sensor be located in a cavity that can be pressurized by a gas to drive the liquid low enough such that the sensor performs its function of activating the cutting off device. This in all embodiments is accomplished by having the sensor at a vertical elevation higher than the inlet to the cavity and a valved passageway, into the cavity, located exteriorly of the pressure vessel.

While the invention has been described with reference to a hot water boiler heating system, it is not limited thereto but applicable to any liquid pressure system in which a low liquid level safety cut-off device is used and actuated by a sensor responsive to the liquid level.

Figure 3:
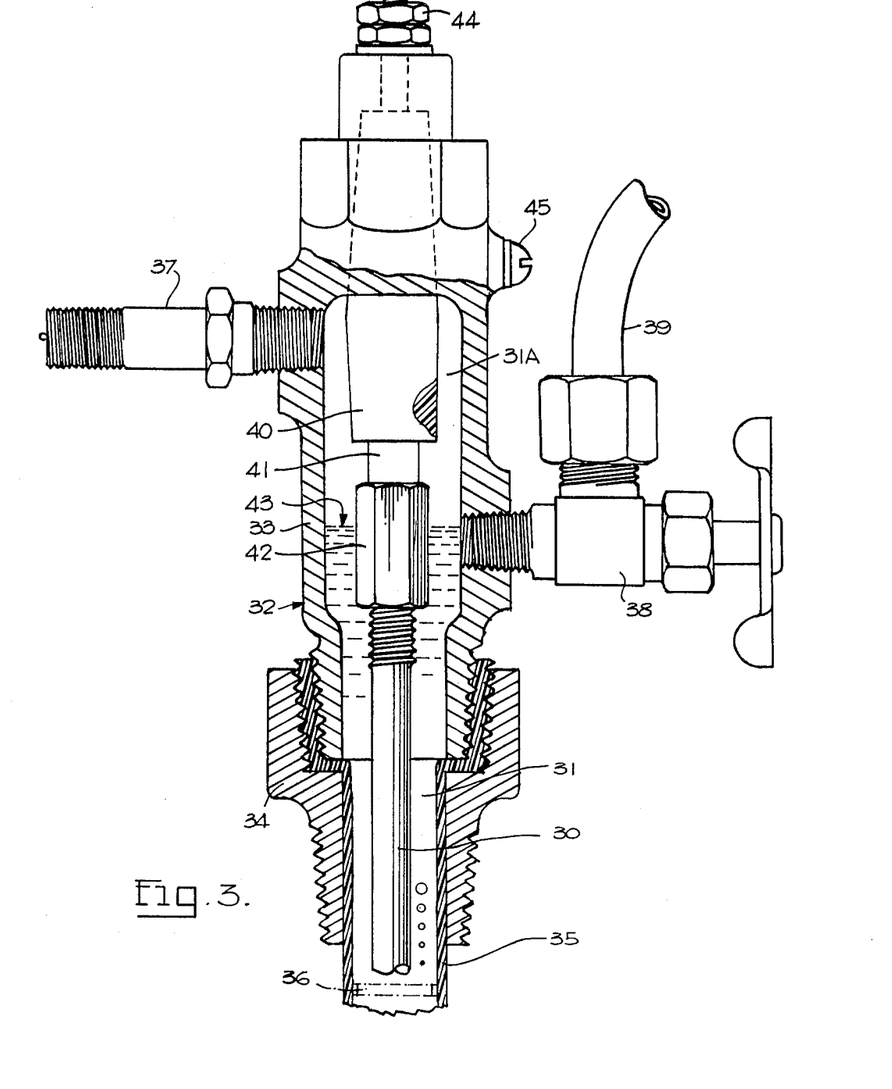
FIG. 3 is an elevational, partial sectional view of a probe constructed in accordance with the present invention.

FIG. 3 illustrates another embodiment for the construction of the sensor and housing containing the same arranged for mounting in the threaded bung of the vessel. Referring to FIG. 3 there is illustrated a liquid level sensor 30 located in a cavity 31 provided by a housing 32. The housing 32 consists of three parts; namely, an upper portion 33, a mounting portion or nipple 34 threaded onto the lower part of portion 33 and a tube 35 clampingly held at one end thereof between the housing portions 33 and 34. The tube 35 is made of an insulating material, for example material sold under E. I. DuPont de Nemours trade mark TEFLON. Alternatively, the tube 35 may be made of a conductive material, for example, copper, steel, aluminum or the like and have a ring of insulating material disposed internally thereof adjacent the lower end. This alternative is shown in FIG. 3 by broken line and identified by the reference numeral 36. The insulating tube or ring 36 as the case may be, prevents short circuiting should the probe 30 accidentally contact the sleeve when such sleeve is made of metal. The housing portion 33 has a valved inlet air passageway provided into the cavity adjacent the upper end thereof by way of a valved stem 37. The cavity 31 has an air outlet passage spaced downwardly from the upper end of the cavity by way of a shut-off valve 38 and line 39 that is connectible to an expansion tank (not shown) of the hot water heating system. The probe 30 is suspended from the top of the housing by way of an insulator 40 and is detachably connected to a rod 41 projecting downwardly therefrom by way of a threaded nut 42. As previously mentioned, the outlet passage provided by means of shut-off valve 38 is spaced downwardly from the upper end of the cavity and provides a cavity portion 31A which is an air space above the liquid level (designated 43 in the drawing). The insulator 40 is located in this air space and such an arrangement overcomes difficulties encountered in the past of conductive deposits building up on the insulator 40 which can render the safety cut-off inoperative. The probe 30 can be connected in a conventional manner to the control circuit of the system by an electrode lead 44.

In accordance with a further aspect of the invention there is provided a fail safe circuit for the sensor.

Figure 4:
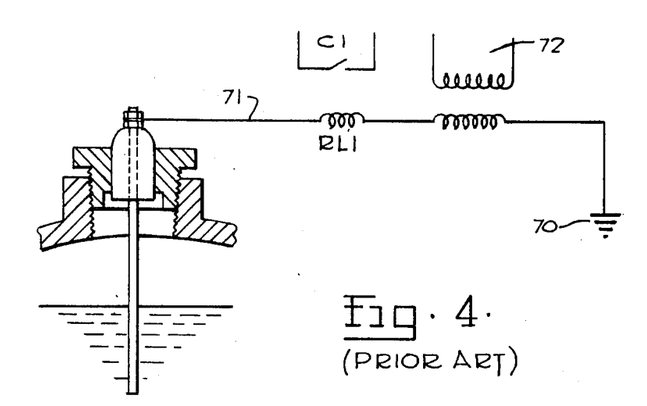
FIG. 4 is a diagrammatic view of a low water cut-off probe and circuit therefor commonly used.
Figure 5:
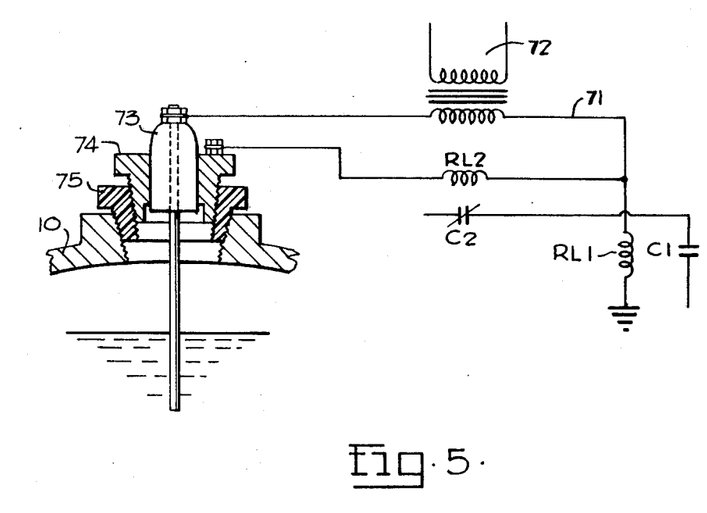
FIG. 5 is a similar view having a fail-safe circuit in accordance with the present invention.

FIG. 4 illustrates the pertinent conventional circuitry portion in a low water cut-off safety control of a hot water heating system. In the conventional systems the probe is connected to ground 70 by way of a line 71 having a relay RL1 therein. The line 71 is energized by a step down transformer 72. The liquid in the boiler is used as a switch to energize the relay RL1 which closes contacts C1 in the safety circuit for the burner of the heating system and permits the burner to operate. If the water level drops below the tip of the probe, relay RL1 is de-energized and the contacts C1 in the safety circuit open interrupting operation of the burner. Over a period of time conductive deposits build up on the lower surface of the insulator mounting the probe in the cavity and even though the water level may drop below the tip of the probe, sufficient current, because of the conductive deposits, can flow such that the relay remains energized. To overcome this difficulty a fail-safe circuit is provided as shown in FIG. 5 consisting of a second relay RL2 in a circuit connecting lines 71 to a bushing 74 mounting the sensor probe in the vessel. The sensor probe is mounted by way of an insulator 73 in the bushing 74 and the latter is electrically insulated from the vessel 10 by a bushing 75 made of an insulating material, such as for example, one identified by the trade mark TEFLON of E. I. DuPont de Nemours. Relay RL2 operates normally closed contacts C2 and has a pull-in voltage substantially less than the hold-in voltage of relay RL1. A conductive build up on the insulator 73 will eventually cause current to flow through the coil RL2. Should this occur and the liquid level remain normal nothing will happen until the resistance across the insulator (due to the conductive deposits) equals the resistance to the water. In that instance replacement of the insulator will be required. Should the liquid level drop below the probe, current flow through relay RL2 causes normally closed contacts C2 to open and interrupt the safety circuit.

Figure 6:
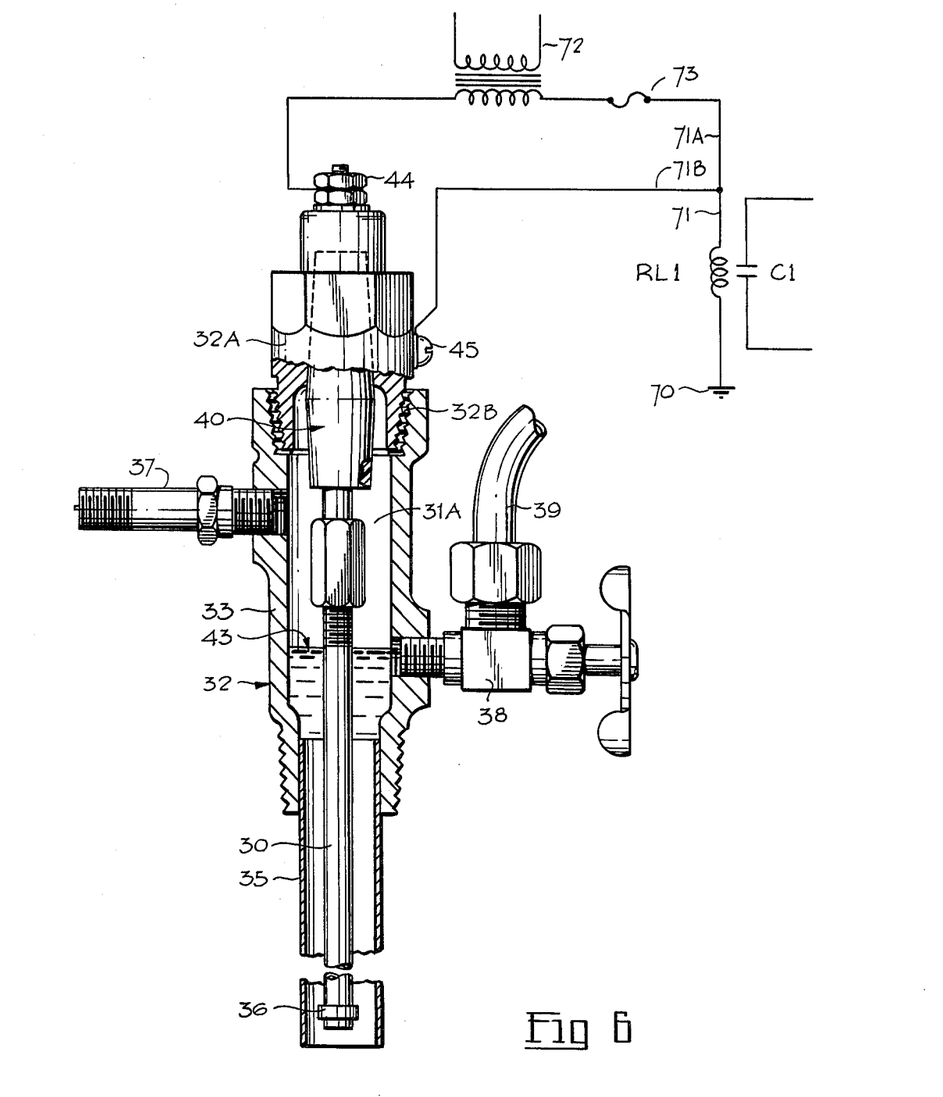
FIG. 6 is similar to FIG. 3 illustrating modifications thereto and including a fail-safe circuit provided in accordance with one aspect of the present invention.

For operability of the foregoing fail-safe circuit it is essential an air bubble remain at all times in the upper portion of the cavity preventing water in the vessel from providing a conductive path from the vessel to bushing 74. In FIG. 6 there is illustrated a preferred form of sensor device that permits testing operability of the sensor probe by simulating a low water condition and including a fail-safe circuit.

The sensor and housing illustrated in FIG. 6 is similar to that illustrated in FIG. 3 differing therefrom in the construction of the housing 32 and includes a fail-safe circuit. Referring to FIG. 6, the housing 32 threads at the lower end thereof directly into the bung or bushing in the boiler and at the opposite end the probe is mounted into a bushing 32A that threads into the upper end of the housing 32. An insulator 32B is interposed between the probe mounting bushing 32A and the housing 32 electrically insulating the mounting bushing from the remainder of the housing. The insulator 32B is a bushing threaded into the upper end of the housing 32 and bushing 32A threads into the insulator. Obviously other mounting arrangements may be employed so long as housing 32 and bushing 32A are electrically isolated from one another.

The safety cut-off and fail-safe circuit includes a relay RL1 in line 71 grounded as at 70, relay RL1 holding contact switch C1 closed during normal operation. Line 71 is connected to branch lines 71A and 71B which in turn are connected respectively to terminal 44 of probe 30 and terminal 45 on bushing 32A. Line 71A is energized by a transformer 72 and is fused by a fuse unit 73.

In the event of a breakdown across the main insulator the current will be shunted back to the transformer. If the main insulator breakdown is severe the voltage across the relay will drop and the circuit will fail-safe.

The burner circuit will shut down if the probe loses water contact. Should there be a breakdown across the isolating bushing and not across the main insulator the current will shunt back to the transformer when the probe is in contact with the water and drop the voltage across the relay.

In the embodiment illustrated in FIG. 6, tube 35 may be of any material press-fit or otherwise mounted in the opening in the lower end of the housing 32. In the event tube 35 is metal a ferrule 36 of insulating material may be mounted in the inner surface of the tube or, as illustrated, on the probe 30. Tube 39 may be made of any material.

Figure 7:
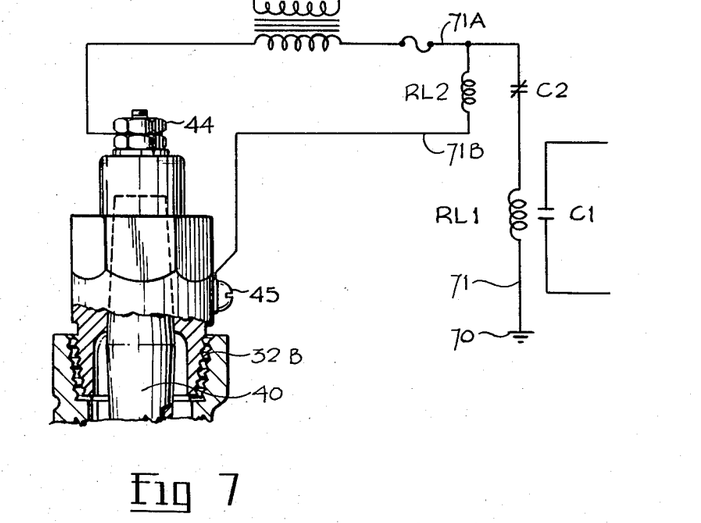
FIG. 7 is a partial view of FIG. 6 incorporating a modified fail-safe circuit.

The embodiment illustrated in FIG. 7 is the same as FIG. 6 except for the arrangement of the safety cut-off and fail-safe circuit. The system is similar to the direct shunt circuit except that in the shunt line 71B there is a relay coil RL2 with a pull-in voltage less than the hold-in voltage of the relay RL1. Relay RL2 operates normally closed contacts C2 in line 71. With a low water condition if the breakdown across the main insulator 40 is sufficient to hold in relay RL1 then relay RL2 will have pulled in and opened contacts C2 de-energizing relay RL1. Should there be a breakdown across the isolating bushing 32B the relay RL2 will pull in the primary relay RL1.

Figure 8:
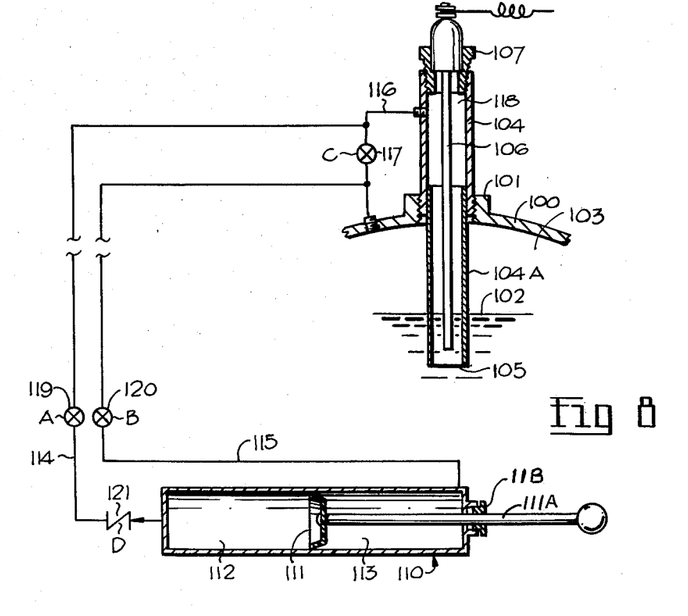
FIG. 8 is a partial sectional and schematic view of a sensor probe cut-off for a steam boiler.

Referring to FIG. 8, there is illustrated the upper portion of a steam boiler 100 having a threaded bung 101 in the upper wall thereof. Water in the boiler has an upper surface designated 102 and above that is a space 103 for steam. A tube 104 is threaded into the bung and a portion (integral with the tube or attached thereto) designated 104A extends downwardly into the vessel terminating in an open end 105 below the surface 102 of the water. A sensor probe 106 is mounted in a bushing 104 (via an insulator) that is threaded into the upper end of tube 104. A piston pump 110, connected by conduits in the arrangement as shown, is used to test operability of the probe. The pump 110 has a movable piston 111 between respective chambers 112 and 113. Piston 110 is mounted on the end of a rod 111A that projects through one end of the casing of the pump. A packing gland 111B on the rod provides a suitable seal. Chambers 112 and 113 are connected via respective conduits 114 and 115 to a conduit 116 on opposite sides of a valve 117. Conduit 116 connects at opposite ends with respectively the steam space 103 in the boiler and the chamber 118 in tube 104. Valves 119 and 120 are in respective conduits 114 and 115 and a one-way flow conduit 121 is in line 114 adjacent pump chamber 112. Valves 119 and 120 are normally closed and valve 117 is normally open. The water in the tube will seek the level of the boiler. The fitting shown has only a low water probe. In practice three other probes would also be used. A slightly shorter one to start the feeder system. A still shorter probe to stop the feed pump. Sometimes a fourth and shortest probe is used to shut down a boiler. This high level safety is used where water carried over with the steam would cause damage. To test, valve 117 is closed and valves 119 and 120 are opened. The pump will then have steam on both sides of the plunger. Pumping will increase the pressure in the probe cavity and depress the water level in the tube. Thus the boiler LWCO can be tested while operating. There is no need for an equalizing pipe system and no water is lost during the test.

I claim:

1. In a pressure heating system having water in a boiler and a low water level sensor and safety cut-off device associated with the boiler and operable to shut off the system when the water in the boiler drops below a predetermined level, said low water sensor device comprising:
(a) a housing having respective upper and lower portions electrically insulated from one another and defining a cavity therein;
(b) means mounting said housing on said vessel adjacent the upper portion thereof;
(c) a sensor in said cavity comprising an elongate electrode responsive to the liquid level in the cavity and operably associated with the burner of the system to shut off the same when the liquid level in the boiler drops below a predetermined level, said electrode being suspended from said upper portion of the housing and electrically insulated therefrom;
(d) passage means providing fluid communication between a lower portion of said cavity and the interior of said vessel;
(e) gas release passage means in said housing for releasing gas from said cavity, said gas release passage means being located at a position spaced downwardly from the upper end of the cavity and exteriorly of the vessel;
(f) first terminal means connected to said electrode; and,
(g) second terminal means connected to said upper portion of said housing.

2. A system as defined in claim 1 wherein said electrode is suspended from an insulator that projects into the cavity and wherein the gas release means is at a lower elevation than the insulator.

3. A system as defined in claim 1 wherein said housing is threaded into a threaded bung in the upper wall of the boiler.

4. A system as defined in claim 3 wherein said housing includes a lower portion that projects into the boiler beyond the upper wall thereof.

5. A system as defined in claim 1, wherein said gas release passage means is located in the lower portion of said housing.

6. A low water sensing device for use in a pressure hot water heating system to operate a safety cut-off when water in the boiler drops below a predetermined level, said device comprising a housing having an elongate cavity therein open at a lower end thereof and closed at the opposite upper end thereof; an elgonate electrode suspended from an insulator extending through said housing at said upper closed end and depending downwardly therefrom; a valved air passage means through said housing into said cavity at a position spaced a selected distance downwardly from the closed end of the cavity; means located between said valved air passage means and the lower open end of the cavity for sealingly mounting said housing in an opening in the upper wall of the boiler of the pressure hot water heating system with the elongate cavity disposed vertically, said housing above said valved passage means being electrically insulated from the housing portion therebelow, a first electrical terminal means connected to said electrode and a second electrical terminal means connected to the upper portion of said housing.

7. A device as defined in claim 6 wherein said first terminal means is connected in a first circuit having a first relay therein maintaining contacts normally closed during operation of the boiler and wherein second terminal means is connected through a second relay to said first circuit.

8. A low water sensing device for use in a pressure hot water heating system to operate a safety cut-off when water in the boiler drops below a predetermined level, said device comprising a housing having an elongate vertically disposed cavity open at the lower end and closed at the upper opposite end; an elongate electrode suspended from an insulator extending through the upper end of said housing, said electrode extending downwardly into said cavity and having a lower end located vertically above the open end of the cavity; a first valved air inlet passage means through said housing into said cavity adjacent the upper end thereof; a second air release passage means through said housing spaced a predetermined distance downwardly from said closed end of the cavity and above the lower end of the electrode; means located between said second air release passage means and the closed end of the cavity for sealingly mounting said housing in an opening in the upper wall of the boiler of the pressure hot water heating system, said housing comprising an upper and a lower portion detachably interconnected and electrically insulated from one another, said upper portion being at a higher elevation than said second air release passage means; first electrical terminal means connected to the electrode; and second electrical terminal means connected to said upper housing portion.

9. A device as defined in claim 8 wherein said insulator projects into said cavity.

10. A device as defined in claim 8 wherein said boiler mounting means is located on said lower portion of said housing and comprises external threads thereon for threading into the opening in the upper wall of the boiler.

11. A low water sensing device for use in a pressure hot water heating system to operate a safety cut-off when water in the boiler drops below a predetermined level, said device comprising:
(a) a housing having a cavity therein, said cavity having a lower open end and a closed upper end;
(b) means for sealingly mounting said housing in an opening in the wall of a boiler and positioning the open end of the cavity in communication with the interior of the boiler and having a major portion of the housing disposed exteriorly of the boiler;
(c) an elongate electrode mounted on said housing and depending downwardly into the cavity from the closed end thereof, said electrode extending in a direction toward the open end of the cavity and being electrically insulated from the housing, said electrode having a lower end below which water in the boiler is considered below a safe operating condition;
(d) means to maintain an air space in an upper end portion of said cavity, above water therein, with the water level in the boiler being above the lower end of the electrode;
(e) means electrically insulating an upper portion of the housing, above the water level in the cavity, from the remainder of the housing;
(f) first terminal means connected to said electrode; and,
(g) second electrical terminal means connected to said upper housing portion insulated from the remainder of the housing.

12. A low water sensing device as defined in claim 11 wherein said first terminal means is connected in a first circuit having a first relay therein maintaining contacts normally closed during operation of the boiler and wherein said second terminal means is connected to said first circuit through a second relay operative to open normally closed contacts in said first circuit means.

13. In a steam boiler system wherein the boiler, during normal operation, is partially filled with water and the remainder contains steam, an elongate housing, mounting means spaced from opposite ends of the housing sealingly mounting the same in the upper wall of the boiler so that an upper portion projects upwardly exteriorly of the boiler and a lower portion projects downwardly interiorly of the boiler into the water contained therein, said housing being open at the lower end thereof, an elongate sensing probe, of a safety cut-off for the burner mounted in said housing and having a lower end located at the low water condition for the boiler, first conduit means connected at opposite ends respectively to the steam chamber of the boiler and the upper portion of the housing, first valve means in said first conduit, a pump having two chambers variable in volume and inter-related with one another such that a decrease in volume in one results in a corresponding increase in volume of the other, second and third conduit means connected at one end to respective ones of the pump chambers and at the other end to said first conduit respectively on opposite sides of said first valve, second and third valves in respective ones of the second and third conduits and a one-way flow control means in said second conduit.

14. In a hot water heating system having water in a boiler and a low water level sensor and safety cut-off device associated with the boiler and operable to shut off the system when the water in the boiler drops below a predetermined level, said low water sensor device comprising:

(a) a housing having a cavity therein;

(b) means mounting said housing on an upper wall of the vessel;

(c) a sensor comprising an elongate probe projecting into said cavity and responsive to the liquid level therein, said sensor being operably associated with the heating system to shut off the same when the liquid level in the boiler drops below a predetermined level;

(d) a passageway in said housing extending downwardly from said sensor into the interior of the vessel and having an open inlet end immersed in the water during normal operation of the boiler, said passageway providing fluid flow communication between the interior of the vessel and said cavity, the inlet to such passage being at a lower vertical elevation than a lower terminal end of the sensor;

(e) valved passage means in said housing disposed exteriorly of the vessel for injecting a gas into said cvity to pressurize the cavity above the normal pressure therein;

(f) means spaced downwardly from the upper end of the cavity and located exteriorly of the vessel for releasing the gas from said cavity;

(g) a first terminal means connected to said sensor and in a first circuit having a first relay therein maintaining contacts of a first switch normally closed during operation of the boiler allowing the burner to operate while the water level is above said predetermined level and which contacts are caused to open in a conventional manner when the water level in the boiler drops below said predetermined level; and, (h) a second terminal means on said housing and connected through a second relay to said first circuit operative to open normally closed contacts of a second switch in said first circuit when conductive deposits in said cavity permits leakage current to flow from said sensor to said housing, said second terminal means being located on a portion of said housing above said gas release means and which portion is electrically insulated from the remaining portion of the housing.

* * * * *